(12) United States Patent
Rotter et al.

(10) Patent No.: US 6,874,458 B2
(45) Date of Patent: Apr. 5, 2005

(54) BALANCE SYSTEM FOR SINGLE CYLINDER ENGINE

(75) Inventors: Terrence M. Rotter, Sheboygan Falls, WI (US); William D. Koenigs, Fond du Lac, WI (US)

(73) Assignee: Kohler Co., Kohler, WI (US)

( * ) Notice: Subject to any disclaimer, the term of this patent is extended or adjusted under 35 U.S.C. 154(b) by 94 days.

(21) Appl. No.: 10/035,101

(22) Filed: Dec. 28, 2001

(65) Prior Publication Data

US 2003/0121489 A1 Jul. 3, 2003

(51) Int. Cl.⁷ ................................................ F02B 75/06
(52) U.S. Cl. ..................................... 123/192.2; 74/603
(58) Field of Search ........................ 123/192.2; 74/603, 74/604

(56) References Cited

U.S. PATENT DOCUMENTS

| | | |
|---|---|---|
| 350,068 A | 9/1886 | Louque |
| 1,141,189 A | 6/1915 | Kauffman |
| 1,172,612 A | 2/1916 | Kremer |
| 1,301,007 A | 4/1919 | Roof |
| 1,310,090 A | 7/1919 | Ricardo |
| 1,342,648 A | 6/1920 | Ricardo |
| 1,410,019 A | 3/1922 | Krause |
| 1,469,063 A | 9/1923 | Wills |
| 1,588,720 A | 6/1926 | Gilbert |
| 1,590,073 A | 6/1926 | Birkigt |
| 1,684,955 A | 9/1928 | Goodwin |
| 1,738,876 A | 12/1929 | Edwards et al. |
| 1,871,899 A | 8/1932 | Marshall |
| 2,235,160 A | 3/1941 | Ljungstrom |
| 2,459,594 A | 1/1949 | Smith |
| 3,118,433 A | 1/1964 | Lechtenberg |
| 3,195,526 A | 7/1965 | Jordan |
| 3,200,804 A | 8/1965 | Hensler et al. |
| 3,314,408 A | 4/1967 | Fenton |
| 3,407,741 A | 10/1968 | Weber et al. |
| 3,457,804 A | 7/1969 | Harkness |
| 3,468,190 A | 9/1969 | Sampietro |
| 3,561,416 A | 2/1971 | Kiekhaefer |
| 3,751,080 A | 8/1973 | Bailey et al. |
| 3,818,577 A | 6/1974 | Bailey et al. |

(Continued)

FOREIGN PATENT DOCUMENTS

| | | |
|---|---|---|
| DE | 742 776 | 12/1943 |
| DE | 2 408 729 | 9/1974 |
| DE | 24 32 188 | 2/1975 |

(Continued)

OTHER PUBLICATIONS

"Technical Innovations–Briggs & Stratton extends engine life", SAE Off–Highway Engineering, Oct. 2001, p. 4.
"Gerotor Lubricating Oil Pump for IC Engines", S. Manco et al., SAE Intn'l FL98 (San Francisco) (17 pages).

(Continued)

*Primary Examiner*—Noah P. Kamen
(74) *Attorney, Agent, or Firm*—Quarles & Brady LLP

(57) ABSTRACT

A balance system and method for balancing piston forces within a single cylinder internal combustion engine are disclosed. The balance system includes a crankshaft, a counterbalance assembly and a groove. The crankshaft includes a crankshaft portion, a crank arm, a crank pin, and a eccentric flange adjacent to the crank arm. The counterbalance assembly has a counterbalancing mass portion and a coupling arm that are fixed with respect to one another, and a pin that protrudes from a side of the counterbalancing mass portion. The coupling arm is supported by the eccentric flange. The groove is capable of receiving the pin, where the pin is capable of sliding along the groove and also rotating within the groove, so that the counterbalance assembly is capable of rotating while moving toward and away from the crankshaft.

21 Claims, 7 Drawing Sheets

U.S. PATENT DOCUMENTS

| | | | |
|---|---|---|---|
| 4,030,179 A | 6/1977 | Schwarz | |
| 4,097,702 A | 6/1978 | Halsted | |
| 4,185,717 A | 1/1980 | Ford, Jr. et al. | |
| 4,198,879 A | 4/1980 | Hornak et al. | |
| 4,283,607 A | 8/1981 | Brightman | |
| 4,285,309 A | 8/1981 | Johansson | |
| 4,308,830 A | 1/1982 | Yamada et al. | |
| 4,332,222 A | 6/1982 | Papez | |
| 4,336,777 A | 6/1982 | Yanagihara et al. | |
| 4,366,787 A | 1/1983 | Gale | |
| 4,372,258 A | 2/1983 | Iwai | |
| 4,380,216 A | 4/1983 | Kandler | |
| 4,391,231 A | 7/1983 | TateBe et al. | |
| 4,401,067 A | 8/1983 | Honda | |
| 4,407,169 A | 10/1983 | Menen | |
| 4,414,934 A | 11/1983 | Vogl et al. | |
| 4,422,348 A | 12/1983 | Campbell | |
| 4,433,651 A | 2/1984 | Nakakita et al. | |
| 4,440,123 A | 4/1984 | Tsai | |
| 4,446,828 A | 5/1984 | Bauder et al. | |
| 4,452,194 A | 6/1984 | Watanabe | |
| 4,458,555 A | 7/1984 | Holtzberg et al. | |
| 4,481,918 A | 11/1984 | Morton | |
| 4,507,917 A | 4/1985 | Kandler | |
| 4,509,474 A | 4/1985 | Schmuck | |
| 4,510,897 A | 4/1985 | Hatz et al. | |
| 4,530,318 A | 7/1985 | Semple | |
| 4,534,241 A | 8/1985 | Remmerfelt et al. | |
| 4,548,253 A | 10/1985 | Funatani et al. | |
| 4,569,109 A | 2/1986 | Fetouh | |
| 4,570,584 A | 2/1986 | Uetsuji et al. | |
| 4,617,122 A | 10/1986 | Kruse et al. | |
| 4,622,933 A | 11/1986 | Fukuo et al. | |
| 4,628,876 A | 12/1986 | Fujikawa et al. | |
| 4,644,912 A | 2/1987 | Umeha et al. | |
| 4,656,981 A | 4/1987 | Murata et al. | |
| 4,660,512 A | 4/1987 | Binder et al. | |
| 4,672,930 A | 6/1987 | Sumi | |
| 4,674,455 A | 6/1987 | Tsuboi | |
| 4,684,267 A | 8/1987 | Fetouh | |
| 4,688,446 A | 8/1987 | Ishikawa | |
| 4,688,528 A | 8/1987 | Nivi et al. | |
| 4,691,590 A | 9/1987 | Geringer et al. | |
| 4,696,266 A | 9/1987 | Harada | |
| 4,711,823 A | 12/1987 | Shiina | |
| 4,736,717 A | 4/1988 | Fujikawa et al. | |
| 4,781,156 A | 11/1988 | Berger et al. | |
| 4,791,830 A | 12/1988 | Yamamoto et al. | |
| 4,793,297 A | 12/1988 | Fujii et al. | |
| 4,800,777 A | 1/1989 | Imanishi et al. | |
| 4,800,852 A | 1/1989 | Kandler | |
| 4,802,269 A | 2/1989 | Mukai et al. | |
| 4,803,964 A | 2/1989 | Kurek et al. | |
| 4,819,505 A | 4/1989 | Takubo et al. | |
| 4,819,592 A | 4/1989 | van Ligten | |
| 4,819,593 A | 4/1989 | Bruener et al. | |
| 4,822,414 A | 4/1989 | Yoshikawa et al. | |
| 4,828,632 A | 5/1989 | Adam et al. | |
| 4,834,784 A | 5/1989 | Bidanset | |
| 4,836,045 A | 6/1989 | Lobig | |
| 4,838,909 A | 6/1989 | Bidanset | |
| 4,853,179 A | 8/1989 | Shiina | |
| 4,867,806 A | 9/1989 | Shiina | |
| 4,892,068 A | 1/1990 | Coughlin | |
| 4,898,133 A | 2/1990 | Bader | |
| 4,909,197 A | 3/1990 | Perr | |
| 4,926,814 A | 5/1990 | Bonde | |
| 4,928,550 A | 5/1990 | Sakai et al. | |
| 4,934,442 A | 6/1990 | Futamura et al. | |
| 4,949,687 A | 8/1990 | Emmersberger | |
| 4,958,537 A | 9/1990 | Diehl et al. | |
| 4,964,378 A | 10/1990 | Tamba et al. | |
| 4,986,224 A | 1/1991 | Zuffi | |
| 5,002,023 A | 3/1991 | Butterfield et al. | |
| 5,038,727 A | 8/1991 | Burns et al. | |
| 5,057,274 A | 10/1991 | Futamura et al. | |
| 5,085,184 A | 2/1992 | Yamada et al. | |
| 5,152,264 A | 10/1992 | Evans | |
| 5,163,341 A | 11/1992 | Murrish et al. | |
| 5,197,422 A | 3/1993 | Oleksy et al. | |
| 5,197,425 A | 3/1993 | Santi | |
| 5,207,120 A | 5/1993 | Arnold et al. | |
| 5,241,873 A | 9/1993 | Hormann | |
| 5,243,878 A | 9/1993 | Santi | |
| 5,265,700 A | 11/1993 | Santi | |
| 5,282,397 A | 2/1994 | Harkness et al. | |
| 5,282,444 A | 2/1994 | Ito et al. | |
| 5,323,745 A | 6/1994 | Sato et al. | |
| 5,335,532 A | 8/1994 | Mueller et al. | |
| 5,357,917 A | 10/1994 | Everts | |
| 5,370,093 A | 12/1994 | Hayes | |
| 5,375,571 A | 12/1994 | Diehl et al. | |
| 5,421,297 A | 6/1995 | Tamba et al. | |
| 5,463,809 A | 11/1995 | Hoffman et al. | |
| 5,497,735 A | 3/1996 | Kern et al. | |
| 5,555,776 A | 9/1996 | Gazza | |
| 5,556,441 A | 9/1996 | Courtwright et al. | |
| 5,560,333 A | 10/1996 | Genouille | |
| 5,588,407 A | 12/1996 | von Essen et al. | |
| 5,615,586 A | 4/1997 | Phillips et al. | |
| 5,651,336 A | 7/1997 | Rygiel et al. | |
| 5,664,464 A | 9/1997 | Carson | |
| 5,711,264 A | 1/1998 | Jezek et al. | |
| 5,758,615 A | 6/1998 | Kreuter | |
| 5,809,958 A | 9/1998 | Gracyalny | |
| 5,823,153 A | 10/1998 | Santi et al. | |
| 5,863,424 A | 1/1999 | Lee | |
| 5,887,678 A | 3/1999 | Lavender | |
| 5,904,124 A | 5/1999 | Poehlman et al. | |
| 5,927,242 A | 7/1999 | Kollock | |
| 5,947,074 A | 9/1999 | Yapici | |
| 5,964,198 A | 10/1999 | Wu | |
| 5,979,392 A | 11/1999 | Moorman et al. | |
| 5,988,135 A | 11/1999 | Moorman et al. | |
| 6,006,721 A | 12/1999 | Shannon et al. | |
| 6,047,667 A | 4/2000 | Leppanen et al. | |
| 6,055,952 A | 5/2000 | Gau | |
| 6,076,426 A | 6/2000 | Genouille | |
| 6,109,230 A | 8/2000 | Watanabe et al. | |
| 6,116,205 A | 9/2000 | Troxler et al. | |
| 6,126,499 A | 10/2000 | Katayama et al. | |
| 6,170,449 B1 | 1/2001 | Saiki et al. | |
| 6,213,081 B1 | 4/2001 | Ryu et al. | |
| 6,269,786 B1 | 8/2001 | Snyder et al. | |
| 6,293,981 B1 | 9/2001 | Holderle et al. | |
| 6,373,205 B1 | 4/2002 | Weimer et al. | |
| 6,382,166 B1 * | 5/2002 | Klika et al. | 123/192.2 |
| 6,395,049 B2 | 5/2002 | Knodler et al. | |

FOREIGN PATENT DOCUMENTS

| | | |
|---|---|---|
| DE | 2432188 A1 * | 2/1975 |
| DE | 3 03 803 A1 | 4/1982 |
| DE | 3 040 686 A1 | 5/1982 |
| DE | 3120190 A1 | 5/1982 |
| DE | 31 20 190 A1 | 6/1982 |
| DE | 36 07 133 A1 | 9/1987 |
| DE | 38 41 374 A1 | 11/1988 |
| DE | 39 27 593 A1 | 2/1991 |
| DE | 41 21 647 C1 | 4/1992 |
| DE | 44 41 798 A1 | 6/1995 |
| DE | 195 38 837 C1 | 2/1997 |

| | | |
|---|---|---|
| DE | 100 10 530 A1 | 9/2001 |
| EP | 0 077 634 A1 | 4/1983 |
| EP | 0 227 277 A1 | 7/1987 |
| GB | 249 693 A | 4/1926 |
| GB | 355365 | 8/1931 |
| GB | 378216 | 8/1932 |
| GB | 749 864 | 6/1956 |
| GB | 749 864 A | 6/1956 |
| GB | 1 141 189 | 1/1969 |
| GB | 1 449 329 | 9/1976 |
| GB | 2 311 820 A | 10/1997 |
| JP | 57-146938 A | 9/1982 |
| JP | 57-171139 A | 10/1982 |
| JP | 57-173636 A | 10/1982 |
| JP | 58-118350 | 7/1983 |
| JP | 58-161134 U | 10/1983 |
| JP | 60-139994 U | 9/1985 |
| JP | 62-15640 U | 1/1987 |
| JP | 1-106657 U | 7/1989 |
| JP | 06-050387 | 2/1994 |
| JP | 8-261290 | 10/1996 |
| JP | 9-184545 | 7/1997 |
| JP | 9-512618 | 12/1997 |
| JP | 2000-507670 | 6/2000 |
| WO | WO 86/04122 A1 | 7/1986 |
| WO | WO 95/26474 | 10/1995 |
| WO | WO 97/37151 | 10/1997 |
| WO | WO 00/43655 A1 | 7/2000 |
| WO | WO 02/061303 A1 | 8/2002 |

OTHER PUBLICATIONS

Chapter 2, Piston Motion, Fundamentals of Automotive Engine Balance, W. Thomson, 1978, pp. 7–13.

Internal–combustion engines, Bosch Automotive Handbook, 4th ed. 1996, pp. 384–389.

"A Ricardo–designed Two–cylinder Engine," The Motor, May 20, 1924.

Pope, Jr., A.W., "The C.U.E. Cooperative Universal Engine for Aviation Single–Cylinder Research", CSAE Journal (Transactions), Jan. 1941, pp. 33–40.

"FEV 'Systemmotor' Research Engine," obtained at www.fev.com, printed Mar. 17, 2003, 2 pgs.

Chapter 17, Piston–engine mechanics and balance, Combustion Engine Processes, Lichty, 1967, pp. 582–593.

The Internal Combustion Engine in Theory or Practice, vol. 2: Combustion, Fuels, Materials, Design, revised edition, Charles Fayette Taylor, 1985, pp. 244–251.

Shigley, Joseph Edward; "Dynamic Analysis of Machines," New York, McGraw–Hill, 1961, pp. 534–551.

* cited by examiner

BALANCE SYSTEM FOR SINGLE CYLINDER ENGINE

FIELD OF THE INVENTION

The present invention relates to single cylinder internal combustion engines such as those used to power lawnmowers, sump pumps, portable generators and other devices. In particular, the present invention relates to a balance system within such an engine that nullifies or reduces vibration of the engine resulting from reciprocation of the piston within the engine.

BACKGROUND OF THE INVENTION

A major cause of vibration in a single cylinder engine is piston reciprocation. The piston is started and stopped twice during each rotation of the crankshaft, and reactions to the forces that accelerate and decelerate the piston are imposed upon the engine body as vibration in directions generally parallel to the piston axis. When operated in a device such as a lawn mower, the engine produces vibrations that can be transmitted through the device to the operator. This vibration is uncomfortable and could produce operator fatigue. Even when operated in a device in which there is no issue of operator fatigue (e.g., sump pumps or portable generators), engine vibration is undesirable because it causes maintenance problems and tends to reduce the useful life of the machine.

To some extent such vibrations can be decreased by providing the engine with a counterweight fixed on its crankshaft, and located at the side of the crankshaft axis directly opposite the crankpin by which the piston, through the connecting rod, is connected to the crankshaft. More commonly, two counterweights may be used on the crankshaft, one located on each side of the piston axis. In either case, such a crankshaft counterweight arrangement produces a net resultant centrifugal force vector that is diametrically opposite to the crankpin.

Although such a crankshaft counterweight arrangement can be designed to cancel some or even all of the primary acceleration and deceleration forces on the piston assembly along the piston axis, the centrifugal force of the crankshaft counterweights also has a component transverse to the piston axis. This transverse force component produces lateral vibration, the amount of which increases in direction proportion to the degree to which the crankshaft counterweights successfully cancel out the acceleration and deceleration forces on the piston assembly.

For this reason, most single cylinder engines incorporate crankshaft counterweights having a mass that provides a condition of about "50% overbalance", such that the centrifugal force due to the counterweights has a component along the piston axis that is equal to about 50% of the acceleration and deceleration forces on the piston assembly. This represents a compromise between the severe vibration in directions parallel to the piston axis that would result with the condition of no overbalance, and the severe vibration transverse to the piston axis that would result with the condition of 100% overbalance.

Because use of crankshaft counterweights having a 50% overbalance condition does not entirely eliminate the undesirable vibration occurring in single cylinder engines, additional techniques have been employed to further reduce such vibration. A number of these techniques employ one or more reciprocating counterweights that, in contrast to the crankshaft counterweights discussed above, do not rotate with the crankshaft but instead "reciprocate" with respect to the crankshaft—that is, move linearly back and forth towards and away from the crankshaft. These reciprocating counterweights are typically coupled to the crankshaft by way of coupling arms, which have near ends coupled to the counterweights and far ends coupled to the crankshaft.

In order that the reciprocating counterweights reciprocate relative to the crankshaft in direct opposition to the reciprocating motion of the piston and crank pin, circular apertures at the far ends of the coupling arms are supported by eccentric journals on the crankshaft. As the crankshaft rotates, the centers of the eccentric journals rotate about the central axis of the crankshaft, and consequently the far ends of the coupling arms also move around the central axis of the crankshaft. Thus, the coupling arms experience a motion that is similar to that of the connecting rod coupling the piston to the crank pin. This connecting rod-type motion, however, is not reciprocating motion since it is not strictly linear motion.

Conventional designs that employ reciprocating counterweights are designed to produce true reciprocating motion of the reciprocating counterweights, so that the motion of the reciprocating counterweights balance the reciprocation of the piston. In order for the reciprocating counterweights to experience linear, reciprocating motion while the coupling arms experience the connecting rod-type motion, the reciprocating counterweights must be rotatably coupled to the coupling arms to allow relative motion therebetween. At the same time, the movement of the reciprocating counterweights must be guided along a linear path, which typically requires that the reciprocating counterweights be additionally coupled to the crankcase.

For example, U.S. Pat. No. 4,656,981 to Murata et al. provides a reciprocating counterweight that is coupled to arms that in turn are supported by eccentric journals on the crankshaft. The reciprocating counterweight further includes a hole in its far end away from the crankshaft. The hole is configured to receive a pin protruding from the crankcase. As the reciprocating counterweight moves, the degree to which the pin extends into the hole varies, and the reciprocating counterweight is thus guided along a linear path defined by the central axis of the pin. The reciprocating counterweight is free to move along the linear path despite the connecting rod-type motion of the coupling arms, since the reciprocating counterweight is rotatably coupled to the coupling arms.

Although these conventional designs are successful to a large degree in balancing the forces of the piston and thus reducing engine vibration, these designs have certain disadvantages. In particular, because the reciprocating counterweight in such a conventional engine must be both rotatably coupled to coupling arms and also coupled to the crankcase to produce true reciprocating motion, the number of parts moving relative to one another and coupling points between these moving parts within the engine is large. The relative motion between the reciprocating counterweight, the coupling arms, and the crankcase can be a source of wear and tear on the engine, and consequently reduce the useful life of the engine. To reduce this wear and tear, the engine further should be designed so that lubrication is provided at the coupling points between the moving parts. Consequently, the costs and complexity associated with designing and manufacturing such an engine is increased.

It would therefore be advantageous if a new balance system for use in single cylinder engines could be designed that was less costly and more robust than conventional balance systems. In particular, it would be advantageous if such a new balance system provided the same or similar benefits of balancing the forces of the reciprocating piston as are provided by conventional designs employing reciprocating counterweights, but at the same time did not require as many parts moving relative to one another as in conventional designs, such that the number of coupling points between those moving parts was reduced, and the need for lubricating multiple coupling points was eliminated.

SUMMARY OF THE INVENTION

The present inventors have discovered that a single cylinder engine can be provided with counterbalances that have counterbalancing masses and coupling arms positioned between the crankshaft and the counterbalancing masses, where the coupling arms are fixed with respect to, or integrally part of, the counterbalancing masses. Further, to guide the counterbalancing masses along a linear path with respect to the crankshaft, a groove having an axis perpendicular to the crankshaft axis is provided in a wall of the crankcase, and a pin is provided that extends out of a side of the counterbalancing masses along an axis that is parallel to the crankshaft axis. The pin fits within the groove and can slide within the groove along the axis of the groove such that, as the crankshaft rotates, the coupling arms force the counterbalancing masses toward and away from the crankshaft along the axis defined by the groove.

Because the coupling arms are fixed with respect to the counterbalancing masses, the counterbalancing masses experience some rotational or "wobbling" motion in addition to their movement toward and away from the crankshaft, and thus do not experience true reciprocating motion. Because the wobbling motion is relatively small, however, the counterbalancing masses largely balance the forces of the reciprocating piston and reduce engine vibration. Further, because the coupling arms are fixed with respect to the counterbalancing masses, manufacturing costs are reduced, wear and tear on the engine is reduced such that the engine is more robust, and the need for lubricating a joint between the coupling arms and the counterbalancing masses is eliminated.

In particular, the present invention relates to a balance system that includes a crankshaft, a counterbalance assembly and a groove. The crankshaft includes a first crankshaft portion, a first crank arm portion, a crank pin portion, and a first eccentric portion, where the crank pin portion is coupled to the first crankshaft portion by the first crank arm portion, and is further configured to be coupled to a piston by a connecting rod. The counterbalance assembly has a first counterbalancing mass portion and a first coupling arm portion that are fixed with respect to one another, and a pin that protrudes from a side of the first counterbalancing mass portion, where the first coupling arm portion includes a first circular orifice by which the counterbalance assembly is supported by the first eccentric portion. The groove is capable of receiving the pin, where the pin is capable of sliding along the groove and also rotating within the groove, so that the counterbalance assembly is capable of rotating while moving toward and away from the crankshaft.

The present invention further relates to an internal combustion engine including a crankcase, a cylinder coupled to the crankcase, a piston within the cylinder, and a crankshaft supported by the crankcase. The piston is coupled to a crank pin of the crankshaft by a connecting rod, and the crankshaft includes an eccentric portion. The internal combustion engine further includes a weight supported with respect to the eccentric portion by a coupling arm. The coupling arm and the weight are fixed in position relative to one another, where the weight moves toward and away from the crankshaft as the crankshaft rotates. The internal combustion engine additionally includes a means for guiding the weight along a path as it moves toward and away from the crankshaft.

The present invention additionally relates to a method of balancing forces provided by a piston to a crankshaft within a single cylinder internal combustion engine. The method includes rotating an eccentric portion supported by the crankshaft as the crankshaft rotates, and guiding a counterbalance assembly that is supported by the eccentric portion toward and away from the crankshaft along a path. The method further includes allowing the counterbalance assembly to rotate along a moving axis that is substantially parallel to a central axis of the crankshaft as the counterbalance assembly is guided toward and away from the crankshaft along the path.

DETAILED DESCRIPTION OF THE PREFERRED EMBODIMENT

Figure 1:
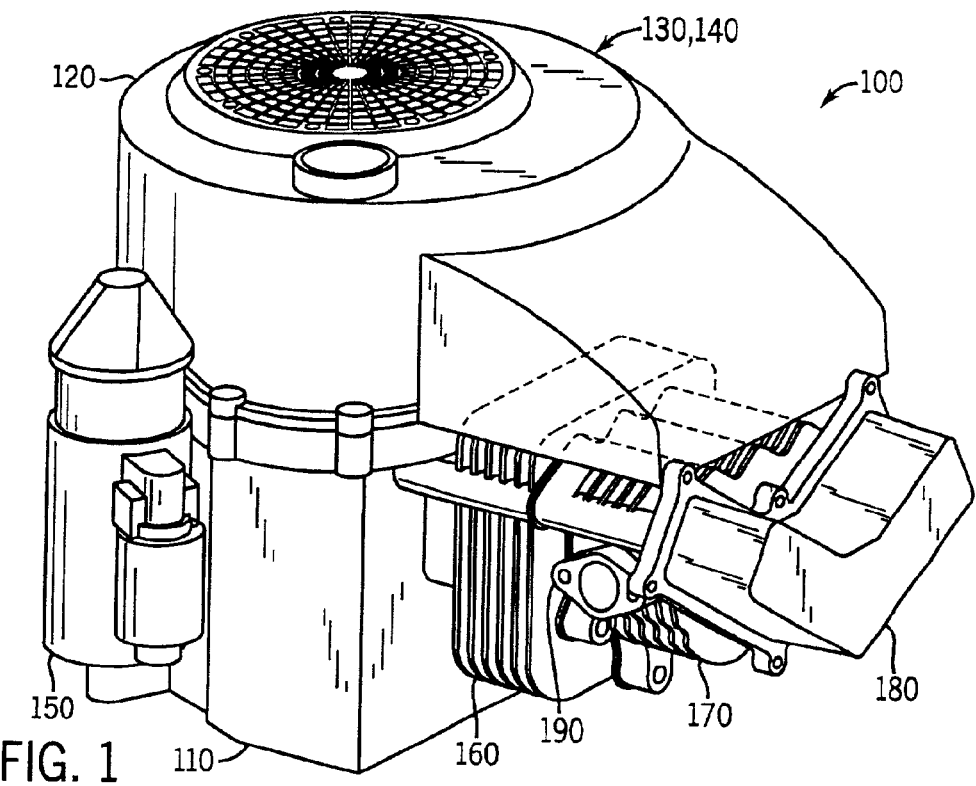
FIG. 1 is a first perspective view of a single cylinder engine, taken from a side of the engine on which are located a starter and cylinder head.
Figure 2:
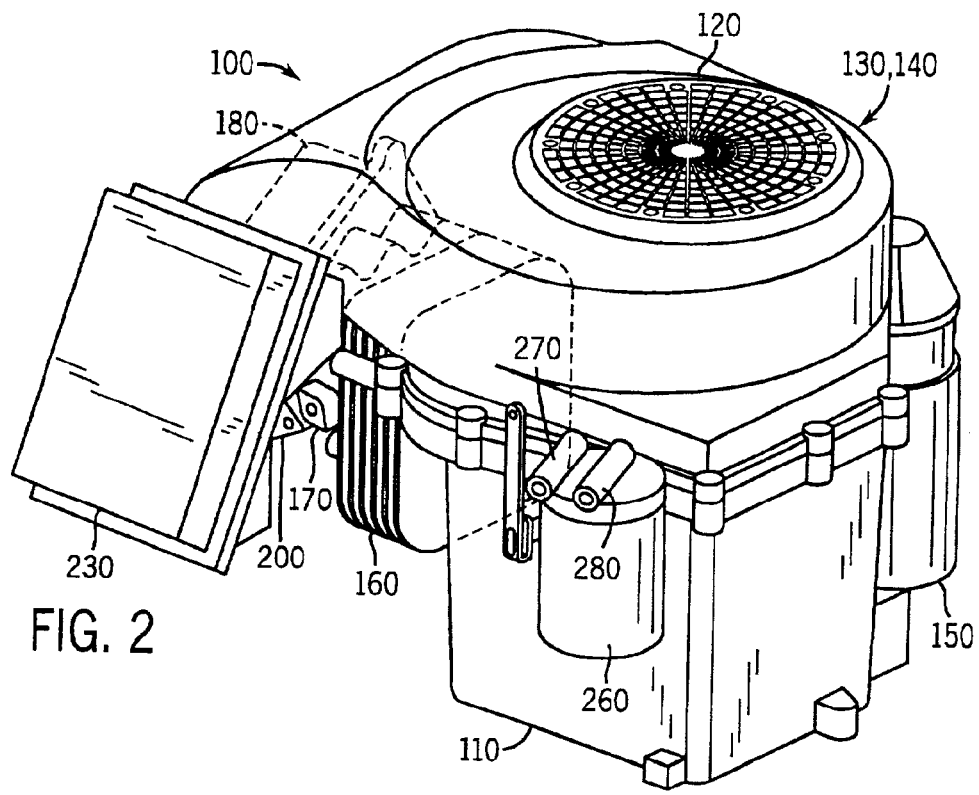
FIG. 2 is a second perspective view of the single cylinder engine of FIG. 1, taken from a side of the engine on which are located an air cleaner and oil filter.

Referring to FIGS. 1 and 2, a new single cylinder, 4-stroke, internal combustion engine 100 designed by Kohler Co. of Kohler, Wis. includes a crankcase 110 and a blower housing 120, inside of which are a fan 130 and a flywheel 140. The engine 100 further includes a starter 150, a cylinder 160, a cylinder head 170, and a rocker arm cover 180. Attached to the cylinder head 170 are an air exhaust port 190 shown in FIG. 1 and an air intake port 200 shown in FIG. 2. As is well known in the art, during operation of the engine 100, a piston 210 (see FIG. 7) moves back and forth within the cylinder 160 towards and away from the cylinder head 170. The movement of the piston 210 in turn causes rotation of a crankshaft 220 (see FIG. 7), as well as rotation of the fan 130 and the flywheel 140, which are coupled to the crankshaft. The rotation of the fan 130 cools the engine, and the rotation of the flywheel 140 causes a relatively constant rotational momentum to be maintained.

Referring specifically to FIG. 2, the engine 100 further includes an air filter 230 coupled to the air intake port 200, which filters the air required by the engine prior to the providing of the air to the cylinder head 170. The air provided to the air intake port 200 is communicated into the cylinder 160 by way of the cylinder head 170, and exits the engine by flowing from the cylinder through the cylinder head and then out of the air exhaust port 190. The inflow and outflow of air into and out of the cylinder 160 by way of the cylinder head 170 is governed by an input valve 240 and an output valve 250, respectively (see FIG. 8). Also as shown in FIG. 2, the engine 100 includes an oil filter 260 through which the oil of the engine 100 is passed and filtered. Specifically, the oil filter 260 is coupled to the crankcase 110 by way of incoming and outgoing lines 270, 280, respectively, whereby pressurized oil is provided into the oil filter and then is returned from the oil filter to the crankcase.

Figure 3:
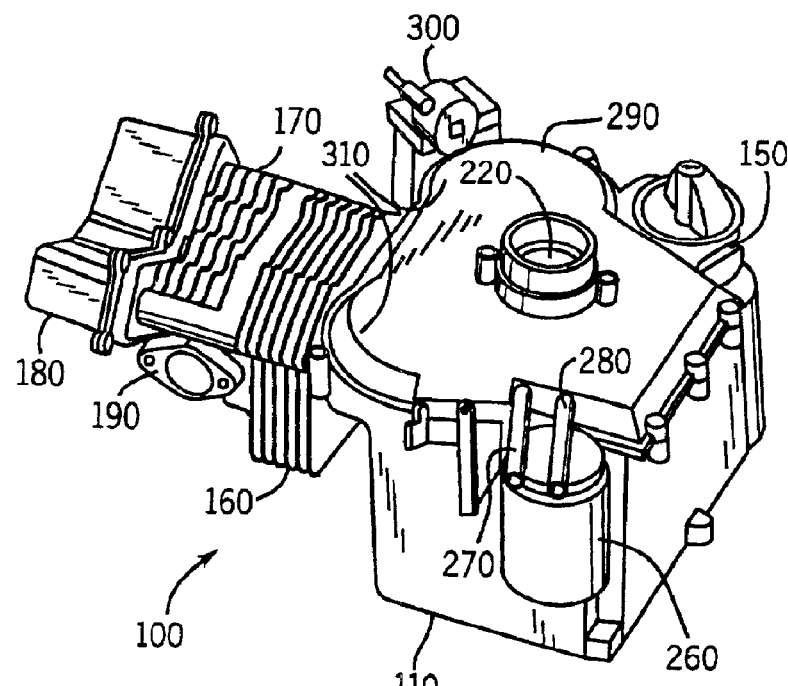
FIG. 3 is a third perspective view of the single cylinder engine of FIG. 1, in which certain parts of the engine have been removed to reveal additional internal parts of the engine.
Figure 4:
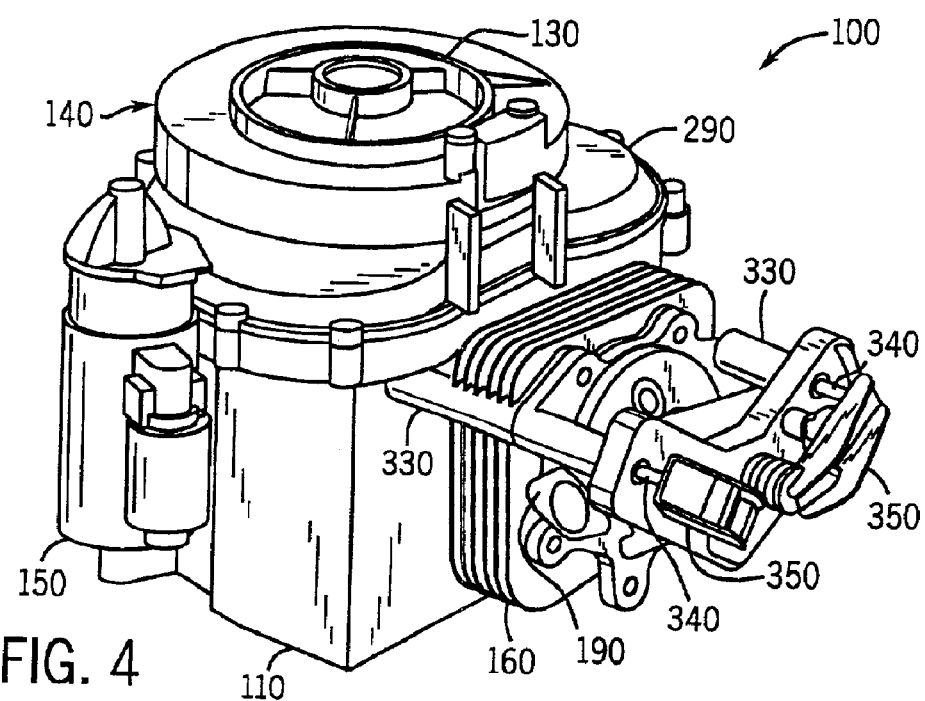
FIG. 4 is a fourth perspective view of the single cylinder engine of FIG. 1, in which certain parts of the engine have been removed to reveal additional internal parts of the engine.

Referring to FIGS. 3 and 4, the engine 100 is shown with the blower housing 120 removed to expose a top 290 of the crankcase 110. With respect to FIG. 3, in which both the fan 130 and the flywheel 140 are also removed, a coil 300 is shown that generates an electric current based upon rotation of the fan 130 and/or the flywheel 140, which together operate as a magneto. Additionally, the top 290 of the crankcase 110 is shown to have a pair of lobes 310 that cover a pair of gears 320 (see FIGS. 5 and 7–8). With respect to FIG. 4, the fan 130 and the flywheel 140 are shown above the top 290 of the crankcase 110. Additionally, FIG. 4 shows the engine 100 without the cylinder head 170 and without the rocker arm cover 180, to more clearly reveal a pair of tubes 330 through which extend a pair of respective push rods 340. The push rods 340 extend between a pair of respective rocker arms 350 and a pair of cams 360 (see FIG. 8) within the crankcase 110, as discussed further below.

Figure 5:
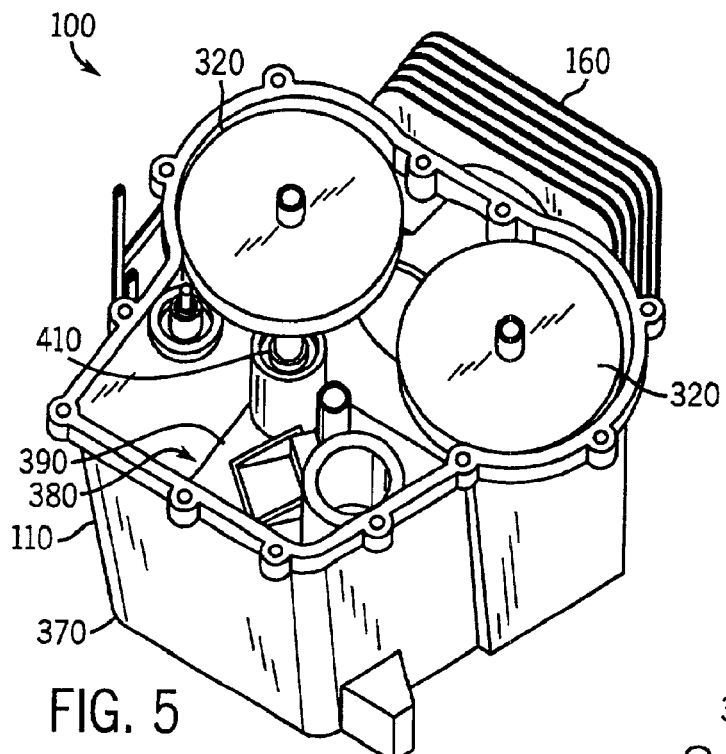
FIG. 5 is fifth perspective view of the single cylinder engine of FIG. 1, in which a top of the crankcase has been removed to reveal an interior of the crankcase.
Figure 6:
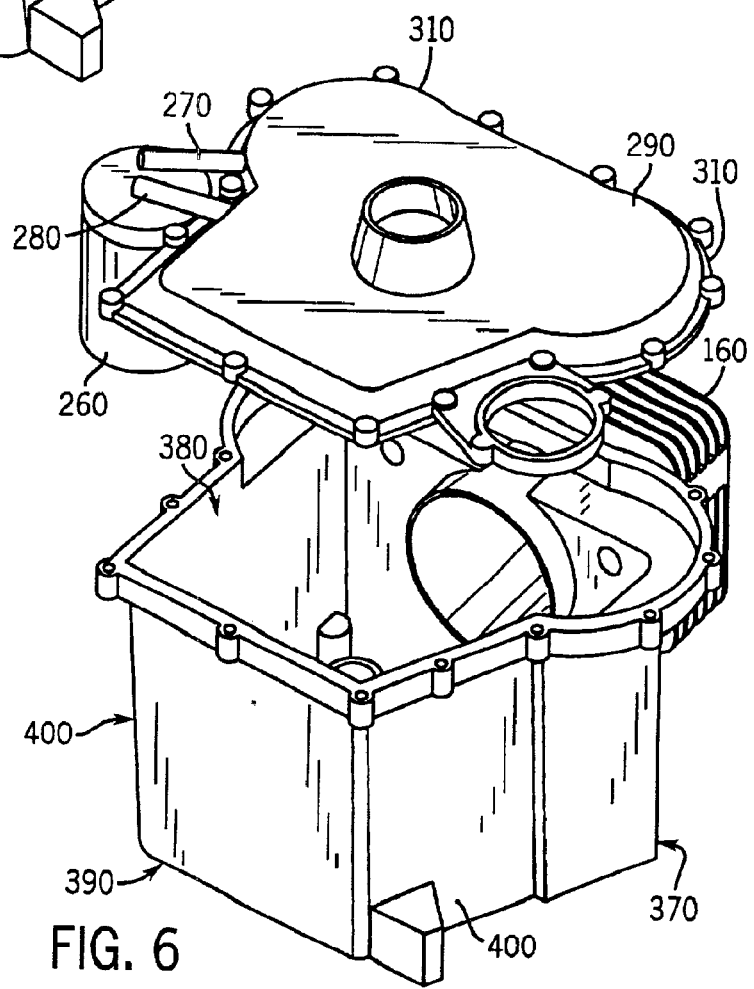
FIG. 6 is a sixth perspective view of the single cylinder engine of FIG. 1, in which the top of the crankcase is shown exploded from the bottom of the crankcase.

Turning to FIGS. 5 and 6, the engine 100 is shown with the top 290 of the crankcase 110 removed from a bottom 370 of the crankcase 110 to reveal an interior 380 of the crankcase. Additionally in FIGS. 5 and 6, the engine 100 is shown in cut-away to exclude portions of the engine that extend beyond the cylinder 160 such as the cylinder head 170. With respect to FIG. 6, the top 290 of the crankcase 110 is shown above the bottom 370 of the crankcase in an exploded view. In this embodiment, the bottom 370 includes not only a floor 390 of the crankcase, but also all six side walls 400 of the crankcase, while the top 290 only acts as the roof of the crankcase. The top 290 and bottom 370 are manufactured as two separate pieces such that, in order to open the crankcase 110, one physically removes the top from the bottom. Also, as shown in FIG. 5, the pair of gears 320 within the crankcase 110 are supported by and rotate upon respective shafts 410, which in turn are supported by the bottom 390 of the crankcase 110.

Figure 7:
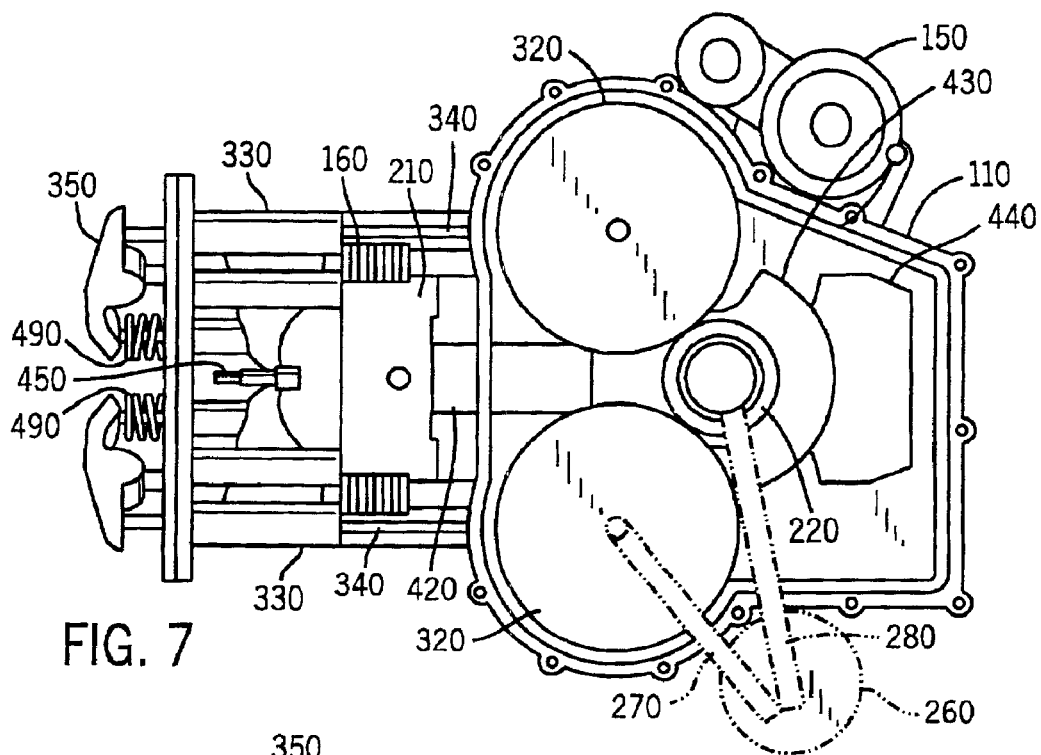
FIG. 7 is a top view of the single cylinder engine of FIG. 1, showing internal components of the engine.

Referring to FIG. 7, a top view of the engine 100 is provided in which additional internal components of the engine are shown. In particular, FIG. 7 shows the piston 210 within the cylinder 160 to be coupled to the crankshaft 220 by a connecting rod 420. The crankshaft 220 is in turn coupled to a rotating counterweight 430 and two counterbalances 440, which balance the forces exerted upon the crankshaft 220 by the piston 210. The crankshaft 220 further is in contact with each of the gears 320, and thus communicates rotational motion to the gears. In the present embodiment, the shafts 410 upon which the gears 320 are supported are capable of communicating oil from the floor 390 of the crankcase 110 (see FIG. 5) upward to the gears 320. The incoming line 270 to the oil filter 260 is coupled to one of the shafts 410 to receive oil, while the outgoing line 280 from the oil filter is coupled to the crankshaft 220 to provide lubrication thereto. FIG. 7 further shows a spark plug 450 located on the cylinder head 170, which provides sparks during power strokes of the engine to cause combustion to occur within the cylinder 160. The electrical energy for the spark plug 450 is provided by the coil 300 (see FIG. 3).

Figure 8:
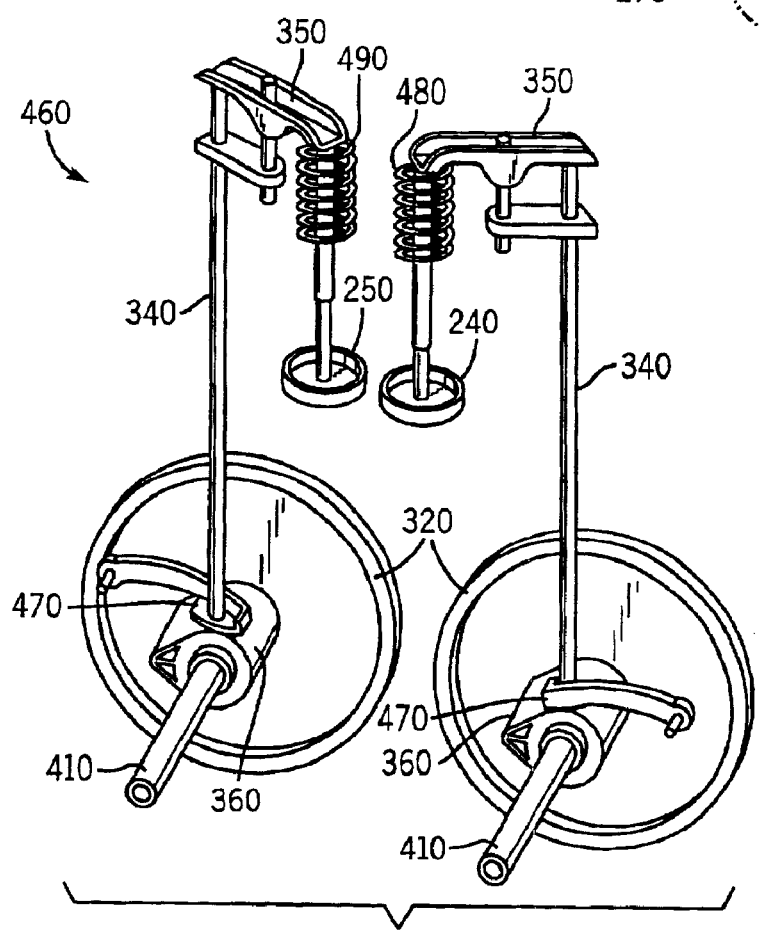
FIG. 8 is a perspective view of components of a valve train of the single cylinder engine of FIG. 1.

Further referring to FIG. 7, and additionally to FIG. 8, elements of a valve train 460 of the engine 100 are shown. The valve train 460 includes the gears 320 resting upon the shafts 410 and also includes the cams 360 underneath the gears, respectively. Additionally, respective cam follower arms 470 that are rotatably mounted to the crankcase 110 extend to rest upon the respective cams 360. The respective push rods 340 in turn rest upon the respective cam follower arms 470. As the cams 360 rotate, the push rods 340 are temporarily forced outward away from the crankcase 110 by the cam follower arms 470. This causes the rocker arms 350 to rock or rotate, and consequently causes the respective valves 240 and 250 to open toward the crankcase 110. As the cams 360 continue to rotate, however, the push rods 340 are allowed by the cam follower arms 470 to return inward to their original positions. A pair of springs 480,490 positioned between the cylinder head 170 and the rocker arms 350 provide force tending to rock the rocker arms in directions tending to close the valves 240,250, respectively. Further as a result of this forcing action of the springs 480,490 upon the rocker arms 350, the push rods 340 are forced back to their original positions.

In the present embodiment, the engine 100 is a vertical shaft engine capable of outputting 15–20 horsepower for implementation in a variety of consumer lawn and garden machinery such as lawn mowers. In alternate embodiments, the engine 100 can also be implemented as a horizontal shaft engine, be designed to output greater or lesser amounts of power, and/or be implemented in a variety of other types of machines, e.g., snow-blowers. Further, in alternate embodiments, the particular arrangement of parts within the engine 100 can vary from those shown and discussed above. For example, in one alternate embodiment, the cams 360 could be located above the gears 320 rather than underneath the gears.

Figure 9:
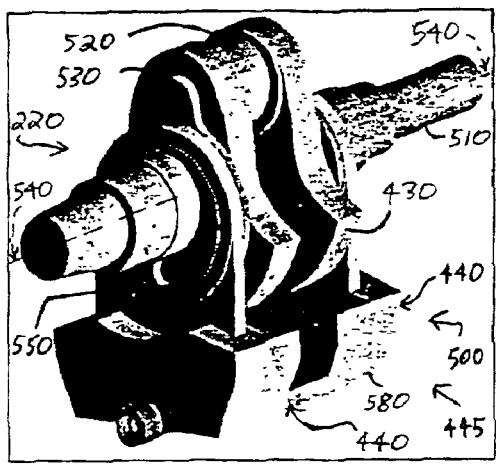
FIG. 9 is a perspective view of components of the crankshaft and a new balance system of the single cylinder engine of FIG. 1.
Figure 10:
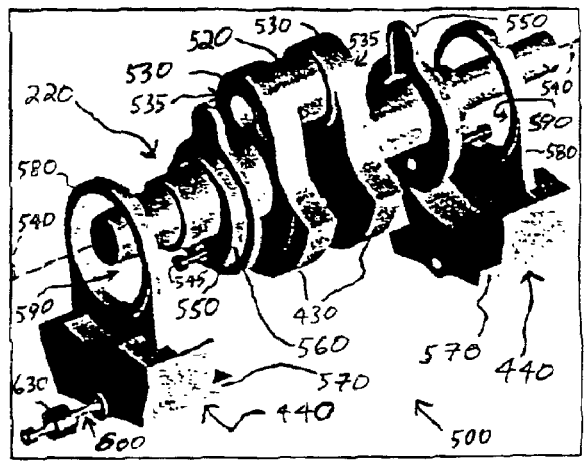
FIG. 10 is a perspective, exploded view of the components of the crankshaft and the new balance system of FIG. 9.

Turning to FIGS. 9 and 10, perspective assembled and exploded views are provided, respectively, of components of a new balance system 500 employed by the engine 100. Specifically, the new balance system 500 includes the crankshaft 220, the rotating counterweight 430, and the counterbalances 440. Further as shown, the crankshaft 220 includes main crankshaft segments 510, a crank pin 520, and a pair of crank arms 530 coupling the crank pin to the main crankshaft segments. When assembled within the engine 100, the connecting rod 420 connects the crank pin 520 to the piston 210 (see FIG. 7). In the embodiment shown, the rotating counterweight 430 includes a pair of weights, each of which is an extension of a respective one of the crank arms 530 and is diametrically opposed from the crank pin 520 across a central axis 540 of the crankshaft 220. In alternate embodiments, the rotating counterweight 430 need not include two separate weights, and need not be integrally formed as part of the crank arms 530.

Further as shown in FIGS. 9 and 10, two eccentric flanges 550 having eccentric journals or rims 560 are further fitted onto the crankshaft 220 and affixed to two respective outer sides 535 of the crank arms 530 by respective bolts 545 (only one of which is shown). The two counterbalances 440, each of which has a respective counterbalancing mass 570 and a coupling arm 580 with a circular cavity 590, are also fit onto the crankshaft. More specifically, the circular cavity 590 of each coupling arm 580 fits over a respective one of the eccentric rims 560, about which the coupling arm is able to rotate. In accordance with the present embodiment of the invention, the respective coupling arms 580 of the respective counterbalances 440 are integrally formed with, or otherwise fixed in position with respect to, the respective counterbalancing masses 570 to form the respective counterbalances 440. Also, the counterbalances 440 preferably are identical to one another in order to reduce manufacturing costs.

The counterbalances 440 are held together by a pin 600, and together form an overall counterbalance assembly 445 (see FIG. 9). Depending upon the embodiment, the pin 600 can be (or be replaced with) any of a variety of different types of fasteners, including bolts, screws, or other fasteners known in the art that hold the counterbalances 440 together. Also, the counterbalances 440 in certain embodiments are integrally formed as one piece. Further, while in accordance with the present embodiment of the invention, the eccentric flanges 550 are separate pieces that are positioned onto the crankshaft 220, in alternate embodiments the eccentric flanges 550 or the eccentric journals/rims/bearings 560 of those flanges can be integrally formed with the crankshaft. Similarly, the crankshaft 220 itself can be integrally formed or formed from multiple separate pieces such as the crank pin 520 and the crank arms 530.

Figure 11:
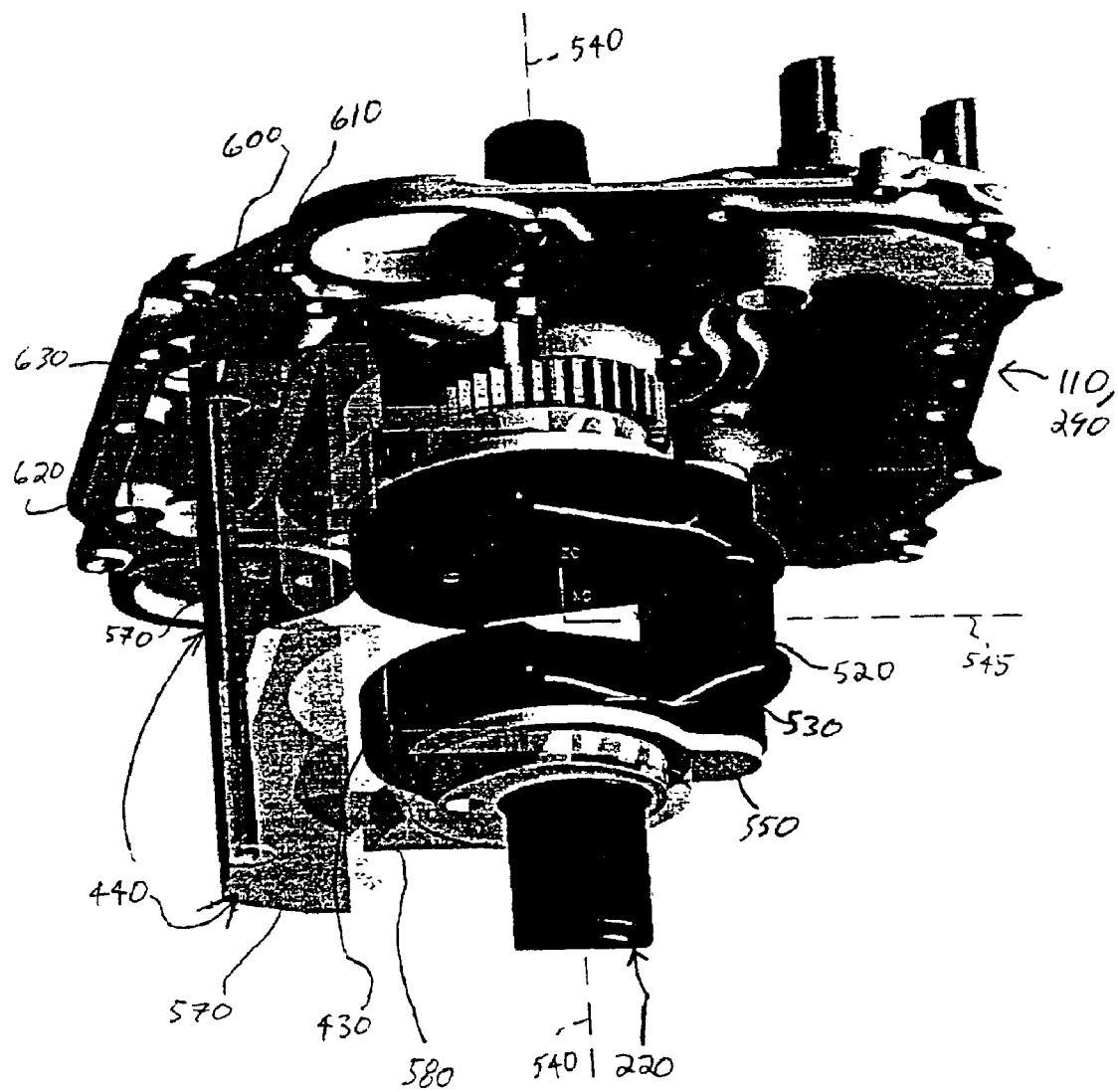
FIG. 11 is a perspective, cut-away view of the engine of FIG. 1, showing components of the new balance system.

Referring to FIG. 11, the new balance system 500 is shown positioned in relation to the top 290 of the crankcase 110. In particular, the crankshaft 220 having the crank arms 530, crank pin 520 and rotating counterweight 430, the eccentric flanges 550, and the counterbalances 440 having counterbalancing masses 570 and coupling arms 580 are shown in position relative to the top 290 of the crankcase 110. As the crankshaft 220 rotates, the counterbalances 440 move towards and away from the crankshaft due to the interaction of the eccentric rims 560 and the circular cavities 590 (see FIG. 10) of the coupling arms 580. The movement of the counterbalances 440 is guided by a slot or groove 610 in the top 290 of the crankcase 110, into which an end 620 of the pin 600 fits. The groove 610 is perpendicular to the central axis 540 and parallel to a piston axis 545 along which the piston reciprocates, while the pin 600 is parallel to the central axis.

Figure 12:
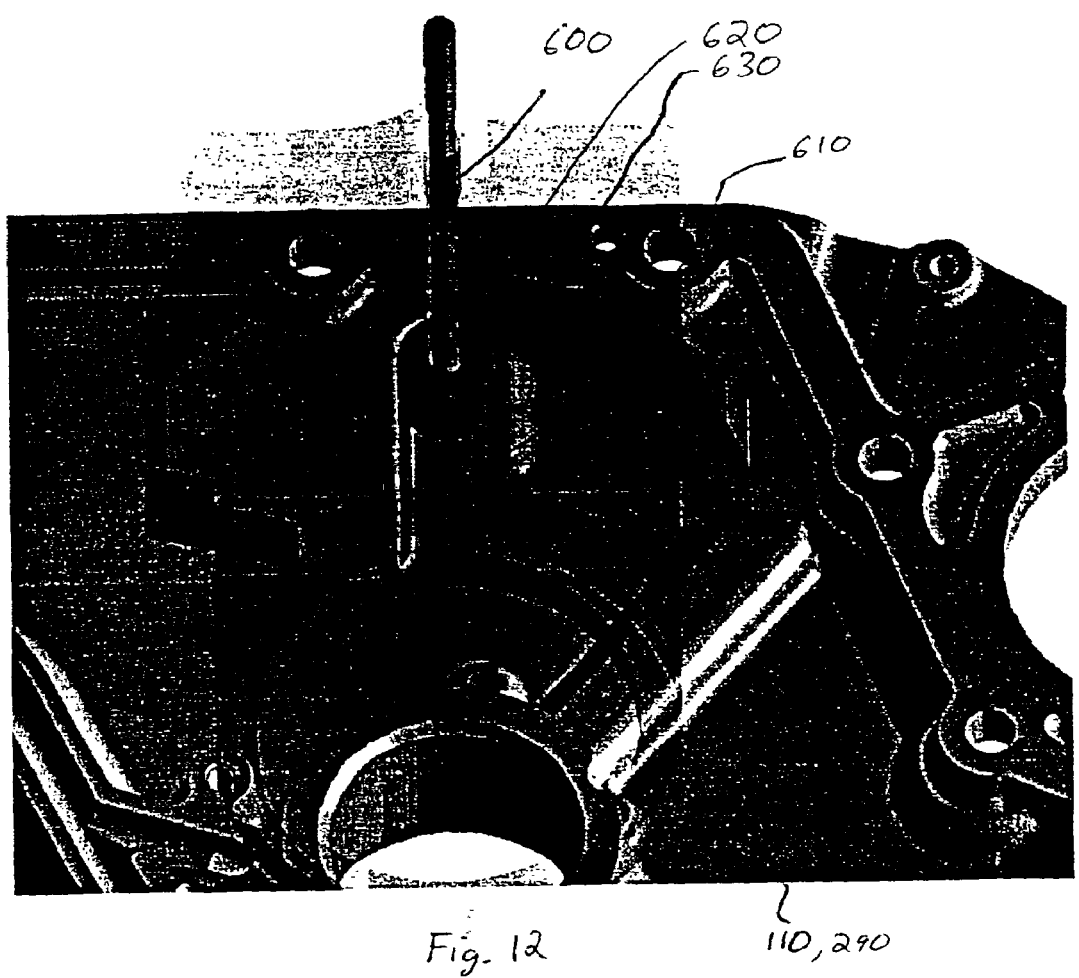
FIG. 12 is a perspective, cut-away view of the top of the crankcase of the single cylinder engine of FIG. 1, where the top is shown to include a groove that interfaces a pin protruding from counterbalances of the balance system.

FIG. 12 more clearly shows how specifically the end 620 of the pin 600 fits within the groove 610 and can move back and forth within the groove to guide the counterbalances 440. Although not required, in the embodiment shown, a wheel or other bearing 630 on the end 620 of the pin 600 moves within the groove 610. Also, in embodiments where a different fastener other than the pin 600 is employed to hold the two counterbalances 440 together (or where the counterbalances are integrally formed as one piece), pins or pin-like projections still protrude out from the sides of the counterbalances 440 to fit within the groove 610. The pins or other projections in such embodiments can be, but need not be, integrally formed with the counterbalances 440.

Because the design of the new balance system 500 employs counterbalances 440 that have the coupling arms 580 that are fixed with respect to the counterbalancing masses 570, and further employs pin 600/groove 610, the movement of the counterbalances 440 toward and away from the crankshaft 220 is largely, but not completely, linear. That is, as the counterbalances 440 move between fully-extended and fully-retracted positions with respect to the crankshaft 220, the counterbalances experience a rotational or "wobbling" motion in addition to linear motion toward or away from the crankshaft. The rotational movement occurs about the axis of the pin 600, which is simultaneously moving back and forth within the groove 610.

Even though the counterbalances 440 experience a wobbling motion as the counterbalances move back and forth with respect to the crankshaft 220, instead of a truly linear or reciprocating motion, the counterbalances nevertheless largely balance the forces generated by the piston 210 and thus largely reduce vibration of the engine 100. Because most of the weight, and consequently most of the momentum, associated with the counterbalances 440 is located in the counterbalancing masses 570 rather than the coupling arms 580, and because this mass is particularly concentrated proximate the axis of the pin 600, the rotational momentum engendered by the wobbling motion of the counterbalances does not largely reduce the ability of the balance system 500 to balance the forces of the piston 210. Further, the wobbling motion itself does not introduce any overly large vibration to the engine 100.

In alternate embodiments, the counterbalance assembly 445 can be formed from components other than the counterbalances 440 shown in FIGS. 9–11. For example, the balance system 500 can include only a single counterbalance piece forming the counterbalance assembly, or the counterbalance assembly can be formed from more than two parts. Also, in one alternate embodiment, the counterbalance assembly has only a single coupling arm, and the balance system has only a single eccentric flange.

Additionally, in alternate embodiments, the device used to guide the motion of the counterbalances 440 can vary from the pin 600 and the groove 610 along the top 290 of the crankcase 110. In a horizontal shaft engine, for example, the groove 610 would be positioned along a vertical wall of the crankcase 110 rather than along the top 290 of the crankcase. Also for example, in an alternate embodiment, the positioning of the groove and the pin are reversed. That is, a groove is positioned along one of the sides of the counterbalances 440 rather than along an interior side of the crankcase, and a pin protrudes out of an interior side of the crankcase rather than from out of a side of the counterbalances.

Also, the groove 610 need not be exactly perpendicular to the central axis 540 and parallel to piston axis 545, and the pin 600 need not be exactly parallel to the central axis 540. For example, the balance system could provide largely the same benefits of balancing the piston forces even where the groove was not directly perpendicular to the central axis 540 but was still within a plane perpendicular to the central axis. Also for example, the balance system could employ a groove that was at an incline with respect to the central axis 540 but nevertheless was within a plane formed by the central axis and the piston axis 545. In such an embodiment, the degree to which the pin 600 protruded into the groove would vary depending upon the position of the counterbalances. In all such embodiments, however, the counterbalances should still be able to move toward and away from the crankshaft 110 and, in addition, be able to rotate with respect to a moving axis formed by the pin 600 or similar device that is substantially parallel to the central axis 540 of the crankshaft.

While the foregoing specification illustrates and describes the preferred embodiments of this invention, it is to be understood that the invention is not limited to the precise construction herein disclosed. The invention can be embodied in other specific forms without departing from the spirit or essential attributes of the invention. Indeed, the present invention can be employed in mechanisms other than internal combustion engines that employ a counterbalance or counterweight including, for example, crank-slider mechanisms employed in machines such as compressors. Accordingly, reference should be made to the following claims, rather than to the foregoing specification, as indicating the scope of the invention.

What is claimed is:

1. A balance system comprising:
    a crankshaft including a first crankshaft portion, a first crank arm portion, a crank pin portion, and a first eccentric portion, wherein the crank pin portion is coupled to the first crankshaft portion by the first crank arm portion, and is further configured to be coupled to a piston by a connecting rod;

a counterbalance assembly having a first counterbalancing mass portion and a first coupling arm portion that are fixed with respect to one another, and a pin that protrudes from a side of the first counterbalancing mass portion, wherein the first coupling arm portion includes a first circular orifice by which the counterbalance assembly is supported by the first eccentric portion; and a groove that is capable of receiving the pin, wherein the pin is capable of moving longitudinally in relation to the groove and also rotating within the groove, so that the counterbalance assembly is capable of rotating while moving toward and away from the crankshaft.

2. The balance system of claim 1, wherein the crankshaft further comprises a second crankshaft portion, a second crank arm portion and a second eccentric portion, wherein the crank pin portion is coupled to the second crankshaft portion by the second crank arm portion.

3. The balance system of claim 2, wherein the counterbalance assembly further includes a second counterbalancing mass portion and a second coupling arm portion that are fixed with respect to one another, wherein the second coupling arm portion includes a second circular orifice by which the counterbalance assembly is supported by the second eccentric portion.

4. The balance system of claim 3, wherein the first and second counterbalancing mass portions are held together by way of the pin.

5. The balance system of claim 3, wherein the first coupling arm portion and the first counterbalancing mass portion are integrally formed as a first counterbalance, and wherein the second coupling arm portion and the second counterbalancing mass portion are integrally formed as a second counterbalance.

6. The balance system of claim 5, wherein the first and second counterbalances are identical, and wherein the first and second eccentric portions are at least one of distinct eccentric flanges that are positioned onto the crankshaft and eccentric journals that are integrally formed with the crankshaft.

7. The balance system of claim 5, further comprising a rotating counterweight, wherein the rotating counterweight is at least one of coupled to a portion of the crankshaft and integrally formed as a portion of the crankshaft.

8. The balance system of claim 7, wherein the rotating counterweight includes a first counterweight integrally formed as a first part of the first crank arm portion and a second counterweight integrally formed as a second part of the second crank arm portion.

9. The balance system of claim 1, wherein the pin is substantially parallel to a central axis of the crankshaft, and wherein the groove is at least one of substantially parallel to a piston axis along which a piston reciprocates within an engine, substantially perpendicular to the central axis, within a plane perpendicular to the central axis, and within another plane formed by the central axis and the piston axis.

10. The balance system of claim 1, wherein a bearing is positioned on the pin, and wherein the bearing fits within the groove.

11. The balance system of claim 1, wherein an end of the pin is received by the groove, and wherein the balance system is employed within at least one of an internal combustion engine and a compressor.

12. The balance system of claim 1, wherein the groove is positioned along an inside surface of a top of a crankcase of an internal combustion engine, and wherein the crankshaft is vertically oriented.

13. An internal combustion engine comprising:
a crankcase;
a cylinder coupled to the crankcase;
a piston within the cylinder;
a crankshaft having a central axis and supported by the crankcase, wherein the piston is coupled to a crank pin of the crankshaft by a connecting rod, and wherein the crankshaft includes an eccentric portion; and
a weight supported with respect to the eccentric portion by a coupling arm, wherein the weight moves toward and away from the crankshaft as the crankshaft rotates;
a protrusion that extends outward away from the weight in a direction that is substantially parallel to the central axis and is at least one of coupled to the weight and integrally formed as part of the weight; and
a structure that guides the protrusion along a path as the weight moves toward and away from the crankshaft.

14. The internal combustion engine of claim 13, wherein the protrusion is a pin and the structure includes a groove formed in the crankcase.

15. The internal combustion engine of claim 14, wherein the groove is at least one of substantially parallel to a piston axis along which the piston reciprocates within the engine, substantially perpendicular to the central axis, within a plane perpendicular to the central axis, and within another plane formed by the central axis and the piston axis.

16. The internal combustion engine of claim 14, wherein at least one of: the weight includes first and second weight portions that are substantially identical and coupled to one another by the pin; and a bearing is positioned between the pin and the groove.

17. The internal combustion engine of claim 13, wherein the piston and the weight move in substantially opposed directions, and wherein the piston and weight are substantially aligned in terms of their respective positions along the central axis.

18. A method of balancing forces provided by a piston to a crankshaft within a single cylinder internal combustion engine, the method comprising:
rotating an eccentric portion supported by the crankshaft as the crankshaft rotates;
guiding a counterbalance assembly that is supported by the eccentric portion toward and away from the crankshaft along a path determined by an at least indirect interaction between a pin and a groove, and
allowing a counterbalancing mass portion of the counterbalance assembly to rotate along a moving axis that is substantially parallel to a central axis of the crankshaft as the counterbalance assembly is guided toward and away from the crankshaft along the path.

19. The method of claim 18, wherein the counterbalancing mass portion and a coupling arm are fixed in position relative to one another, and wherein the coupling arm includes a circular aperture that fits around the eccentric portion.

20. The method of claim 18, wherein the pin protrudes from a side of the counterbalance assembly along the moving axis, and wherein the internal combustion engine includes a crankcase having the groove along an interior side.

21. The method of claim 20, wherein the pin is received by the groove and is capable of both moving longitudinally in relation to the groove and rotating with respect to the groove.

* * * * *